United States Patent Office 2,913,132
Patented Nov. 17, 1959

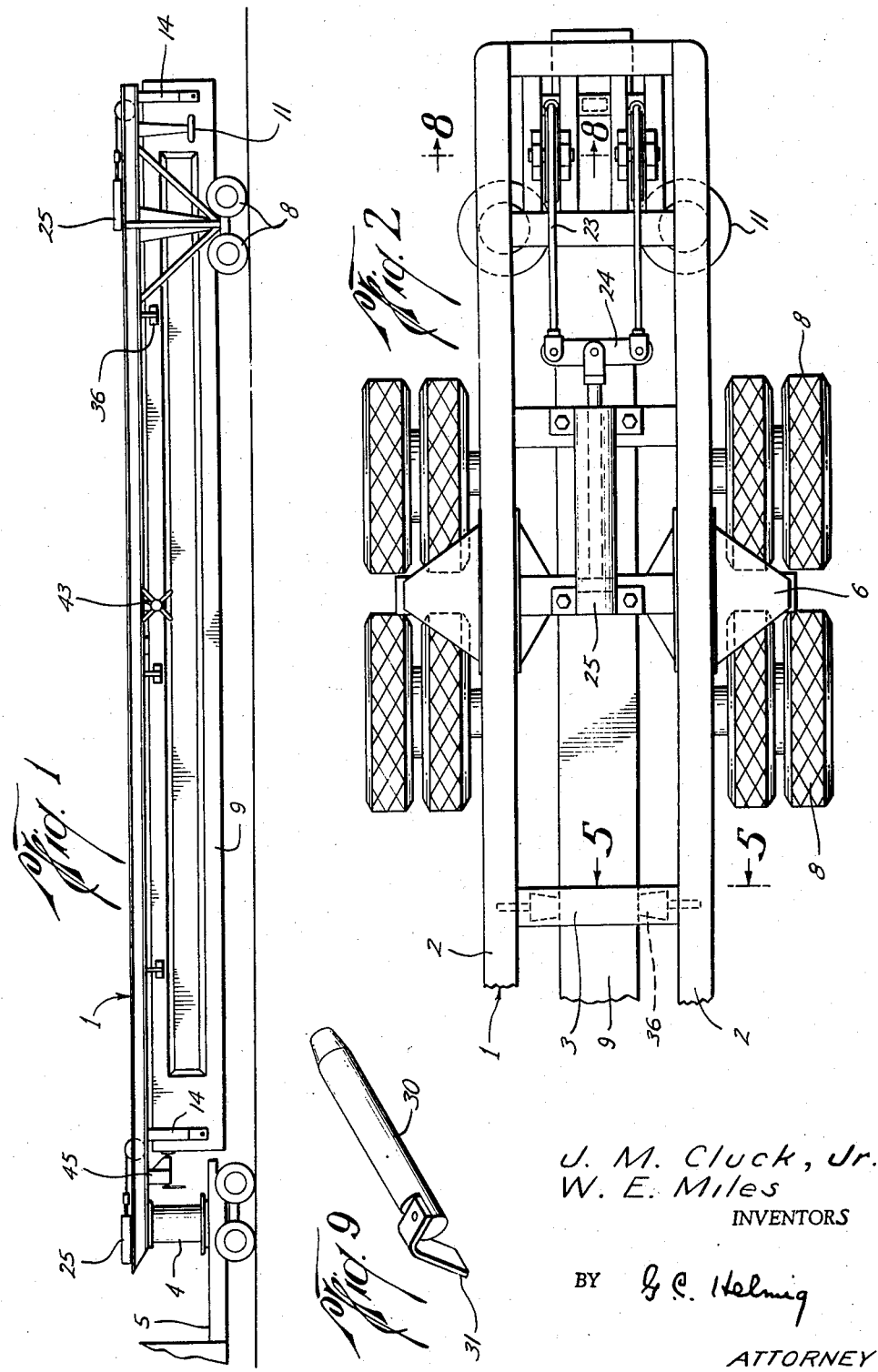

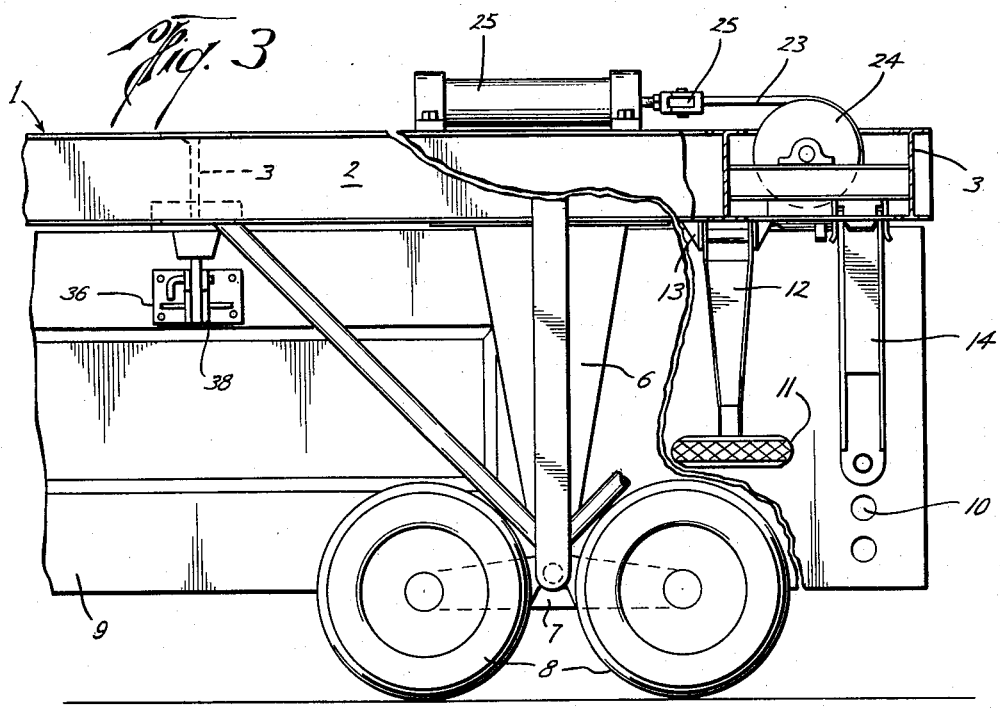
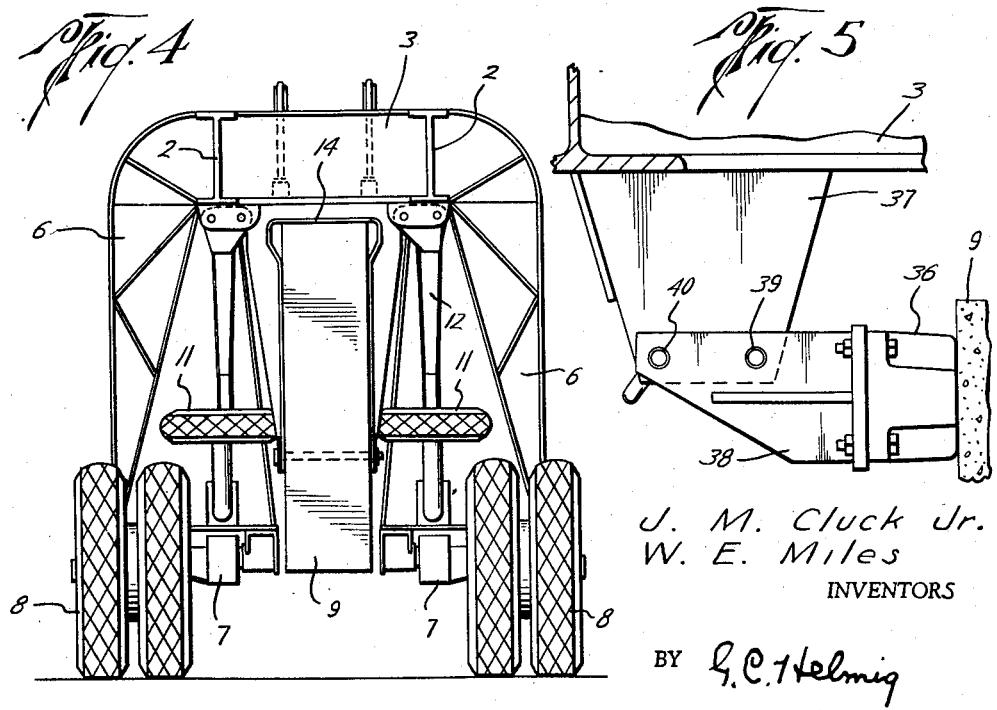

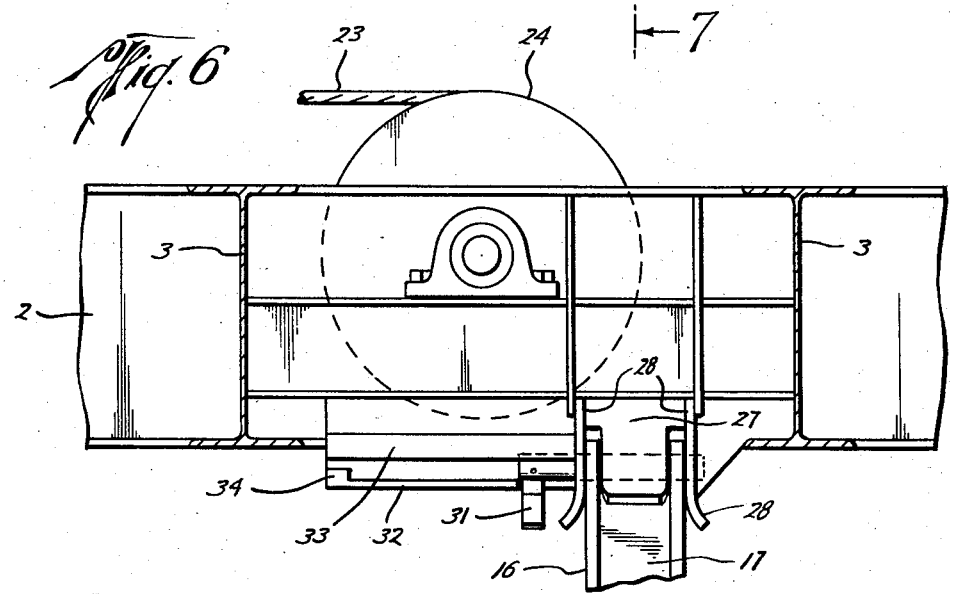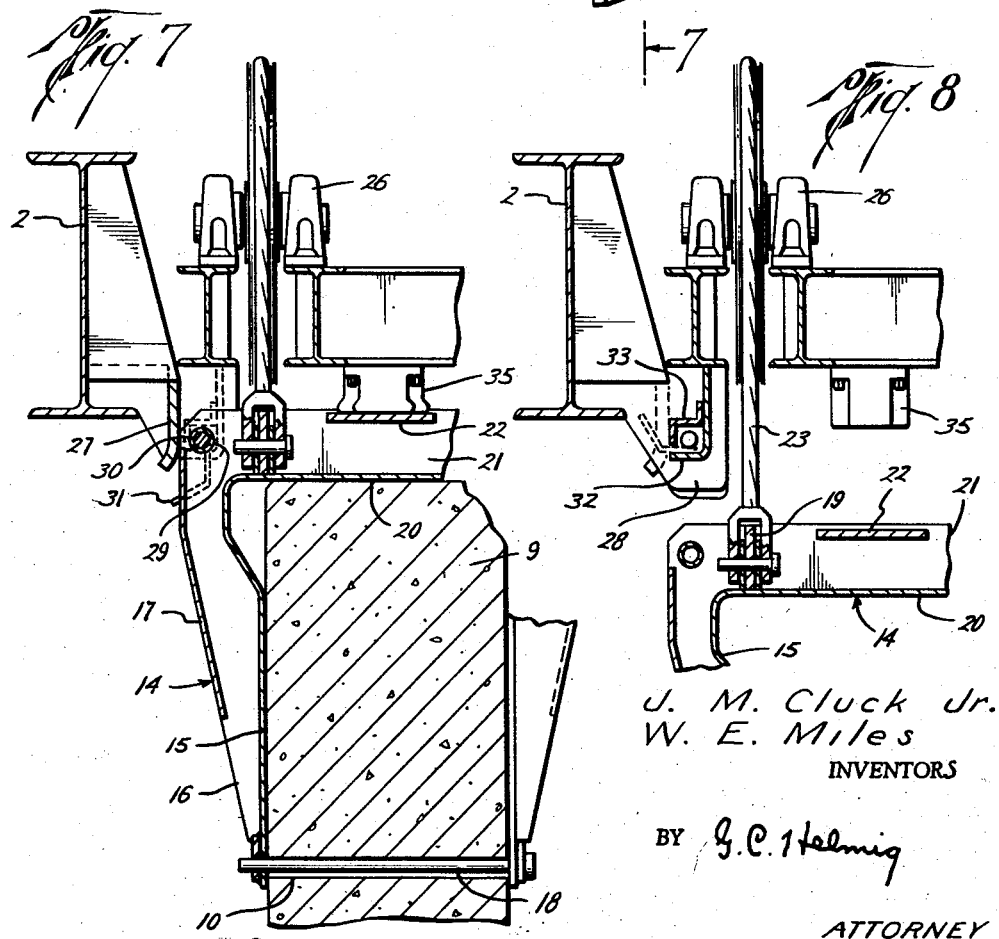

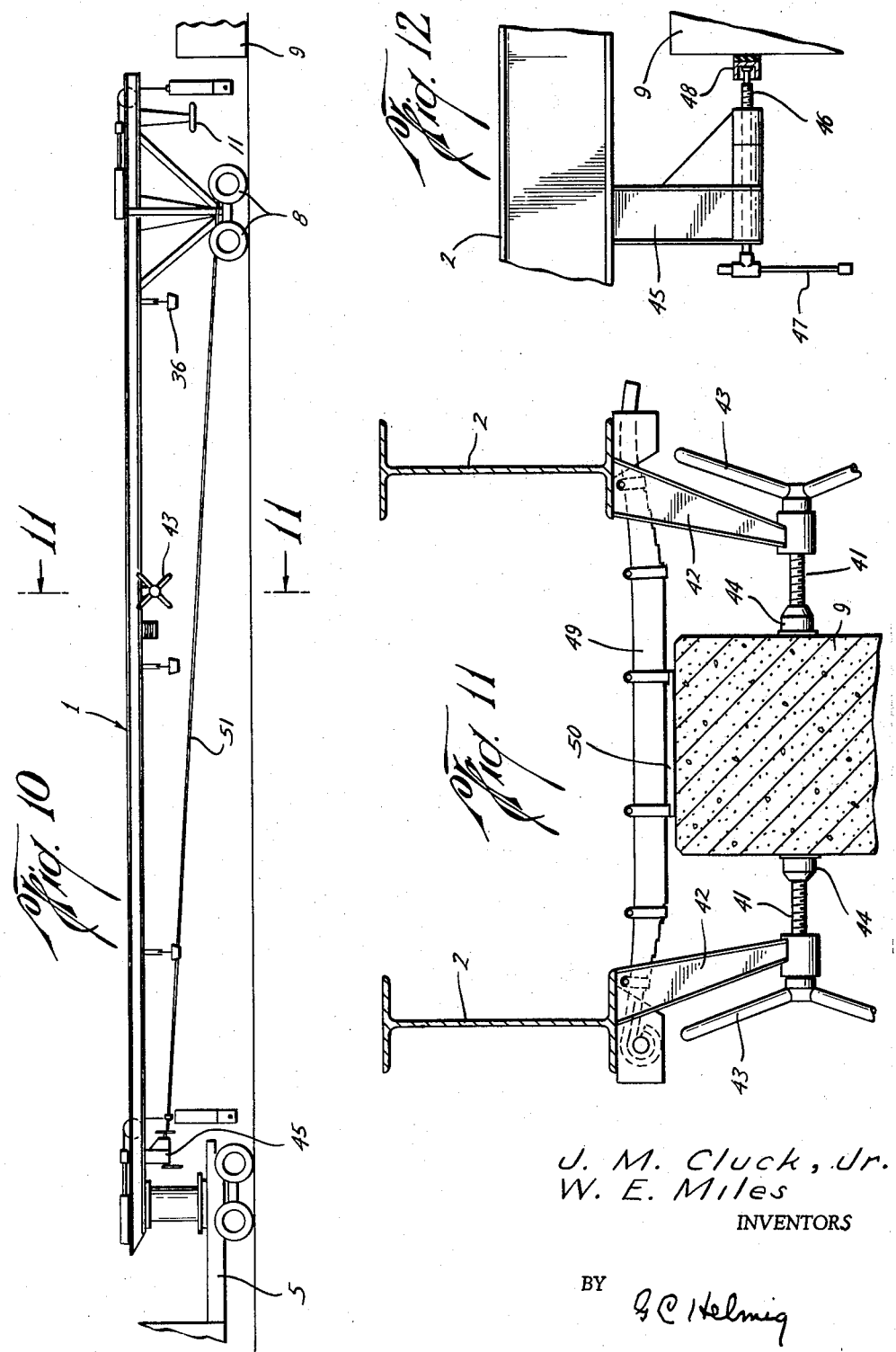

2,913,132
STRADDLE TRAILER

John M. Cluck, Jr., and William E. Miles, Lufkin, Tex., assignors to Lufkin Foundry & Machine Company, Lufkin, Tex., a corporation of Texas Application March 26, 1958, Serial No. 724,041

2 Claims. (Cl. 214—394)

This invention relates to a special purpose vehicle for the handling and transportation of a heavy elongated load such as a precast concrete beam used in the construction industry. Long and narrow concrete girders are cast at a fabrictaion plant to various sizes and to pre-stressed specifications according to engineering requirements and are then hauled to location for quick installation, and their large bulk and heavy weight present difficult handling problems in picking up the load and securing it in a transit position for safe and speedy transportation to a destination without imposition of breakage strain on a freshly set up casting.

It is an object of the invention to provide an improved vehicle particularly designed to be brought into overhead straddle relation with an elongated beam and to elevate and hold the same in a manner to avoid or cushion undue stress in a suspended position for transit.

A further object of the invention is to provide a semitrailer type vehicle in the nature of an overhead crane or longitudinally extending beam structure whose opposite ends directly suspend the opposite ends of a hoisted load and transfer the weight to the immediately adjacent heavy duty tractor which supports the front end of the trailer and the trailing ground wheels supporting the rear end of the trailer and which trailer in readiness for loading can be backed by the truck tractor or telescoped in overhead relation to a ground supported beam by having the rear trailer wheels mounted at the lower ends of a load straddling arch and arranged to run on the ground along both sides of the beam and to be guided in direction by a pair of rearwardly disposed wheels rotatably mounted on transversely spaced apart axes for rolling engagement by the guide wheel treads on the lateral or side faces of the grounded beam.

Another object is to provide a pair of opposite end load suspension cradles arranged to be raised and lowered by hoist mechanism and when elevated to fit at their upper ends into locating pockets and there to be latched in place for the transfer of the load into the trailer independently of the hoist mechanism, and further to provide cushion buffers engageable with the beam load during transit for co-operation with the cradle locating suspension means in resisting shock stress and beam displacement due to vibration, deceleration and side sway inertia forces between the load and the trailer and certain of which buffers are retractable from beam contacting relation and out of interference with the functioning of the previously mentioned guide wheels during trailer travel relative to and either over or away from a grounded load.

Other objects and advantages will become apparent during the course of the following specification having reference to the accompanying drawings wherein Fig. 1 is a side elevation of a traveling crane type of semitrailer embodying the structural improvements constituting the present invention; Figs. 2, 3, and 4 are a top plan view, a side elevation, and a rear elevation, respectively, of the rearward and ground wheel supported end of an overhead beam trailer on a larger scale and with some parts in section; Fig. 5 is a fragmentary detail of a load buffer mounting as viewed on line 5—5 of Fig. 2 and is on a still larger scale than the preceding views; Fig. 6 is a fragmentary enlarged side elevation of the cradle suspension means shown in Fig. 3 and with parts broken away; Fig. 7 is a transverse section on line 7—7 of Fig. 6 showing the cradle in elevated transit position; Fig. 8 is a transverse section on line 8—8 of Fig. 2 of the cradle in position just below its upper limit; Fig. 9 is a detail perspective view of a retractable latch and cradle suspending plunger; Fig. 10 is a side elevation of an unloaded vehicle; Fig. 11 is a transverse section as on line 11—11 of Fig. 10; and Fig. 12 is a fragmentary elevation of an adjustable stop abutment to locate the load longitudinally and to resist load inertia forward force upon vehicle deceleration.

As shown in the drawings, the main body of the trailer vehicle is an overhead crane or beam structure indicated generally by the numeral 1 in bridging relation to its opposite and ground supported end portions. Conveniently, the overhead beam is comprised of a structural steel framework in the form of a pair of transversely spaced longitudinal side members 2—2 connected at longitudinally spaced intervals by a number of cross members 3—3. At its forward end the overhead beam has a dependent post or cylindrical upright column 4 terminating downwardly in a kingpin plate to rest on the usual fifth wheel of a truck tractor 5. Immediately forward of the rear end of the semitrailer is a supporting arch made up of one of the crossbeams 3 and a pair of widely spaced apart structural posts 6—6 (see Fig. 4) projected laterally and vertically downwardly from both side frame members 2—2 and mounted at their lower ends on transversely aligned stub axles for journaling rock beams 7, which carry dual wheels 8 at opposite ends. The rearward running gear on the two sides of the vehicle have no interconnection except through the downwardly open beam supporting arch which affords central working clearance somewhat wider than the width of the load to be handled. Such clearance can be made on the order of nineteen and one-half inches for a trailer suspension beam whose over-all length is about seventy-nine and one-half feet and whose underside is about eighty-six and one-half inches above the ground surface and is intended for handling a concrete beam whose approximate dimensions measure seventy feet long, five feet high, and sixteen inches wide. A precast beam 9 usually is formed at each end with a series of vertically spaced horizontal bolt holes 10, as seen in Fig. 3, for reception of fastenings at final installation.

To guide trailer direction of travel at the rear end when the transversely spaced apart rear wheels 8—8 are running on the ground beside opposite lateral faces of a grounded beam 9 being telescoped by relative trailer movement either forward or backward, there are provided a pair of transversely spaced bearings to track on opposite sides faces of the grounded beam. In the drawings, the guide bearings are shown as a pair of rubber tired wheels 11—11 mounted for rotation on vertical axes transversely spaced apart a distance to present the wheel treads for rolling contact on the lateral or outer side faces of the cast beam 9. Each vertically disposed wheel stub axle is suspended from the overhead beam 1 just behind rolling contact of the ground wheels 8 with the surface of the ground and is welded at its upper end within a downwardly tapered box section leg 12 made up of four similarly shaped flat strips welded together along corner edges. The upper end of each leg 12 is preferably pinned or bolted to a suspension bracket 13 carried on the underside of the main beam 1.

For coupling a load beam to a trailer suspension beam, there are a pair of longitudinally spaced apart cradles along with manual or power operated hoist mechanism and a cradle latching device located at the two extremities of the overlapping beams. Each cradle 14 is of an inverted U-shape to fit astride the beam to be loaded and conveniently is assembled of welded together plates of precut shapes. Figs. 6, 7, and 8 illustrate the cradle detail and indicate that each dependent leg includes an inward plate 15 stiffened by a pair of outwardly projected side plates or wings 16 welded at their inner edges to the side edges of the plate 15. A bridging web 17 is welded along its side edges to the inside faces of the side wings 16 to complete a box section. At the lower ends of the side legs are holes aligned with one another and for alignment with a selected bolt fastening hole 10 in the cast beam and a suspension bolt 18 is for removable passage through the aligned holes for coupling purposes. The upper ends of the plates 15 and 16 have their inner vertical edges welded to a vertical web 19 and a connecting strap 20 bridges the space between and is welded at opposite ends to both webs 19 and along both sides to vertical stiffener flanges 21. A horizontal bridging plate 22 is welded to the inner faces of the upper ends of the stiffening flanges 21 and gives a box section to the top crosspiece of the cradle.

Bolted to the upper webs 20 of the cradle are a pair of clevises on the lower ends of hoist cables 23 which pass over sheaves 24 and, as seen in Fig. 2, are joined at their other ends to an equalizer bar 24 centrally journaled to the connecting rod of a slidable piston contained within a pressure fluid motor cylinder 25 anchored on top of the overhead beam 1. Conventional control valving in a pressure fluid supply system alternately vents and directs pressure fluid to the ends of both piston motor cylinders for the operations of raising and lowering the two cradles in unison. Each sheave 24 is rotatable on a transverse horizontal shaft mounted in blocks 26 which are bolted to adjacent framing members of the overhead beam.

Each set of hoisting cables 23 passes vertically below the sheaves 24 through a downwardly opening socket of a width and length to closely pocket the upper portions or top bar of the cradle 14 in its elevated limit or load carrying transit position. This cradle receiving and locating socket is afforded by two transversely spaced groups of three vertically disposed straps welded on the underside of adjacent framing members for nested co-operation with the upper corners of the cradle. Each group of straps includes one strap 27 extending in a vertical plane longitudinally of the vehicle to fit an adjacent upper edge of the hoist cradle and a pair of straps 28 arranged in transversely extending vertical planes to fit the fore and aft side faces at the upper end of the cradle. Each vertical cradle fitting strap terminates at its lower end in a downwardly and outwardly flared lip for co-operation with the cradle in guiding its upward travel in the locating pocket.

At the upper corners of the cradle side wings 16 there are secured hollow tubes or bearings 29 for longitudinal alignment with openings through the fore and aft locating straps 28 when the cradle is elevated to transit position, as seen in Figs. 6 and 7. Each set of aligned holes and tubes constitutes a keeper formation for removable reception of a projectable latch pin or plunger 30 for securely suspending the cradle at both sides of the trailer beam and relieving the hoist mechanism of the transit load. At its leading end the plunger rod 30, as best seen in Fig. 9, has a conical or tapered end to facilitate entry projection and at its opposite end has secured thereto a laterally projected operating handle 31. Projected longitudinally from and horizontally aligned with the bottom of the plunger receiving openings in the straps 28 is a shaft or plunger slideway 32 afforded by a horizontally disposed flange of an angle bracket secured to the bottom frame structure. A Z-section slip 33 is carried by and co-operates in super- posed relation with the angle bracket 32 for slidable retention of the plunger when the latter is retracted from load transfer position shown in Fig. 6. A stop abutment, as at 34, at the end of the slide bearing bracket 32 may be provided to resist loss of a retracted plunger 30, and additionally the guideway may be provided with a slot positioned to receive the actuating handle 31 when the plunger is projected to load carrying position and the handle is rotated into its slot. The gravity weight of the handle and the frictional load on the plunger pin keep the dependent handle within the slot and against retraction from its fully projected position.

On the underside of the overhead beam and directly above the web plate 22 at the top of each cradle 14 there is conveniently bolted a yieldable elastic bumper preferably comprised of a rubber buffer pad 35 whose bottom face is for contact as a stop abutment with the web 22 when the cradle is raised to its upper limit. The mounting of the buffer pads 35 positions them for face to face contact with the cradles as the latter approach and slightly in advance of reaching final upward load suspension position, so that the elastic material of the pads is placed under a compressive strain by the hoisting mechanism. Accordingly, when the plungers are projected into suspension relation with the elevated cradles and the hoist mechanism goes out of action, the buffer pads 35 by their elasticity serve effectively to cushion shock and to take up vertical slack clearance as might otherwise occur at the cradle bearings.

Similar buffer pads 36 are arranged to contact opposite side or lateral surfaces of the elevated cast beam for centering the same and for cushioning side sway forces during transit. These pads 36 are adjustably mounted for lateral movement toward and away from beam engagement and when the pads on both sides are retracted a wide operating clearance is afforded for lowering and raising the beam load and for manipulation of the vehicle telescopically of the grounded load under the tracking influence of the guide wheels 11, either to bring the overhead crane beam 1 into position to pick up a load or to pull away from a deposited load. The adjustable buffer mount, as shown in Fig. 5, includes a dependent bracket plate 37 secured to the overhead suspension beam and a swinging arm 38 pivoted to the bottom of the plate 37 by a trunnion pin 39 and faced at its free end by the rubber buffer pad 36. A removable lock pin 40 can be inserted through aligned openings in the arm 38 and the mounting bracket 37 in spaced relation to the pivot pin 39 for retaining the swinging arm in inwardly projected and buffer compressed seating contact relation with an elevated beam load. Removal of the latch pin 40 enables the arm to be swung downwardly and outwardly away from the beam receiving loading area.

When several longitudinally spaced pairs of transverse cushioning pads 36 are employed, as, for example, a central pair and two end pairs as shown in the drawings, difficulty may sometimes be experienced in setting one or more of the intermediate pads in inward beam engaging relationship inasmuch as pretensioned beams occasionally bow out of a straight line when permitted to stand free. With that in mind, there may be provided, as shown in detail in Fig. 11, a pair of oppositely facing adjustable jacks for applying pressure against the side face of a bowed beam to bring it back into an approximately straight line relationship. Each jack comprises a screw threaded shaft 41 supported in a transverse horizontal position within an internally threaded head at the lower end of a dependent frame bracket 42. At its outer end the adjustable jack shaft carries an operating handle 43 and at its inner end it has a swiveled bearing head 44 for engagement with the side face of a beam 9. Usually one such jack carried by each side frame member 2 at a longitudinally intermediate location will be sufficient for straightening a bowed beam after it is hoisted to transit position and for the purpose of enabling all the bearing pads 36 to be set in operative positions.

In order to relieve the suspension devices from severe forward thrust forces from beam load inertia on vehicle speed deceleration, it will be desirable to provide on the trailer frame a stop or locating abutment for the front face of the loaded beam. Such abutment is shown in Fig. 1 and in more detail in Fig. 12 and includes a dependent frame bracket 45 in whose lower end is adjustably mounted a horizontally longitudinally extending screw shaft 46 terminating forwardly in an operating handle 47 for turning the shaft and terminating rearwardly in a swivel abutment head 48 for engagement with the forward face of the loaded beam 9. In its inactive position the jack shaft 46 will be threaded toward the front of the vehicle to a forward limit but once the vehicle is loaded and ready for transit, the operation of the handle 47 will cause the screw jack to carry rearwardly the abutment head 48 into tight seating relation with the front face of the beam and thereafter the beam will thrust forwardly against the frame bracket and relieve the suspension members from undue strain when vehicle speed is decreased.

In Fig. 11 there is shown beneath the central part of the frame a resilient buffer or bumper spring for engagement with the top side of the load. The elastic force of the spring will compensate for clearance looseness between the beam and its suspension cradles and between the cradles and the trailer frame and additionally will damp dynamically induced vertical vibrations of the trailer frame during transit while loaded. In the form shown, the resilient bumper is a semielliptical multiple leaf spring 49 projected transversely across the two side frame members 2—2 and pivotally shackled at one end to one of the frame members and slidably shackled at the other end to the other frame member. Intermediate its ends the central part of the spring carries a downwardly facing bearing pad 50 for engagement with the top side of the loaded beam 9. When no load is being carried, the spring 49 will extend downwardly with more of a bow than is shown in Fig. 11. It will be engaged by the top face of a concrete beam when the latter is raised toward its upper transit position and will be deflected under considerable load whereby the stored elastic energy acts on the beam and the two frame members for cushioning shock and minimizing relative vibration.

Road vibrations, racking or weaving and relative oscillation of the spaced apart frame members 2—2 can in the absence of effective corrective expedients be much more pronounced than in the ordinary road vehicle because of the extreme length of the trailer frame. The use of a pair of end suspension cradles serves to transfer the load through a short longitudinal frame distance to the wheels into the ground so that the intermediate portion of the frame is largely relieved from the weight of the load itself and can be built up of lighter structural members than ordinarily would be anticipated, providing road shocks can be effectively minimized, as by means of the transverse spring 49 previously described. During vehicle travel with a loaded beam, the beam itself stiffens the frame against weaving and bending action and for the purpose of reducing excessive frame deflection when traveling unladen, it is proposed, as shown in Fig. 10, to employ a detachably connected tensionable cable 51 extending longitudinally beneath and throughout almost the entire length of the trailer frame 1. As illustrated, the rear end of the cable is detachably connected to the framework near the ground at the rearward running gear and the front end of the cable is detachably connected near the fifth wheel, as, for example, at the rear end of the jack shaft 46 and whose adjustment can be utilized to tension the cable 51 for applying a compression stress on the frame and for thereby stiffening the assembly.

In operation, the trailer vehicle is wheeled into end to end alignment with a cast beam resting on the ground and then the trailer is backed over the load and is guided by the vertical axle guide wheels 11 until the load is completely overlaid by the suspension beam with the dependent cradles in approximate alignment with the mounting openings 10 at each end of the load. When the cradle and load connections have been effected, the load is hoisted above the ground and the flexible suspension cables hung from the sheaves 24 bring the cradle tops into their receiving pockets and compress the downwardly facing buffers 35. The lift cradles at both ends are then pinned to the main structure for transportation and the hoisting mechanism is left inoperative until such time as the load is to be lowered. The release of hydraulic pressure and the compression of the rubber bumper block as well as the load itself, eliminate slack between the plunger 30 and its bearings. The side buffers 36, which have been hanging outwardly away from or in clearance relation with the load, are now projected toward one another and into elastic centering relation with the sides of the beam load and are latched, as shown in Fig. 5, and thereupon offer cushioning resistance to side sway and inertia forces during transit.

When the transported load is to be deposited, the side buffers 36 are again retracted and the hoist mechanism is operated to take over and slightly raise the load to relieve the plunger pins 30 so that they can be retracted easily and then the cradles are lowered until the beam rests on solid ground, whereupon the beam and cradle connections 18 are removed. The flexibility of the hanging cradle suspending cables minimizes strain or binding when the trailer is pulled forward away from the grounded beam and during which time the guide wheels 11 keep the trailer in centered relation with the grounded load.

While the drawings show each load supporting cradle 14 as a rigid inverted U-shaped frame, it will be feasible to have one or both of the dependent legs adjustably mounted or hinged on the upper crossbar for varying the load receiving space between the legs. Among other things, the use of relatively movable cradle components will accommodate beams of varying widths and additionally will enable the removable coupling pin shown at 18 to be replaced with fixed stub pins for projection into the opposite ends of the beam openings 10 in effecting the load carrying relation. In like manner the dependent guide wheels 11—11 may be mounted to enable their relative transverse adjustment to desired fixed settings.

Although the description has been limited to the preferred embodiment of the invention as shown in the drawing, it is to be understood that various modifications can be made as come within the scope of the appended claims.

What we claim is:

1. In a load carrying vehicle having an elongated overhead beam to overlie an elongated load suspended by the beam in parallel relation one to another, hoist mechanism on the beam for raising and lowering the load to and from transit relation and including a pair of load carrying cradles, one adjacent each end of the elongated beam, a detachable coupling between each cradle and said beam to suspend the cradle in its raised transit position independently of said hoist mechanism, transversely spaced apart brackets dependently suspended from the beam, a swinging arm pivoted by each bracket on an axis extending longitudinally of said beam, a load engaging bearing face on one end of said arm for movement with the arm between transversely spaced positions inwardly and outwardly of said pivot axis and means detachably coupling the arm against outward swinging travel and locating its bearing face inwardly positioned for co-operation with other similarly positioned bearing faces to engage opposite side faces of the suspended load and thereby resist load lateral movement relative to the overhead beam.

2. In a vehicle of the class described, an elongated load suspending beam structure, running gear supporting devices at opposite ends of said beam structure, load suspending means carried by said overhead beam structure adjacent its opposite running gear supported ends and a tensionable tie connection adapted for detachable connection with opposite end portions of said beam structure in vertically spaced relation with the horizontal plane of the beam at such times as the beam is unladen.

References Cited in the file of this patent

UNITED STATES PATENTS

| | | |
|---|---|---|
| 1,951,088 | Feeley et al. | Mar. 13, 1934 |
| 2,388,870 | Sackett | Nov. 13, 1945 |
| 2,452,937 | Krake | Nov. 2, 1948 |
| 2,472,843 | Muise | June 14, 1949 |
| 2,478,513 | Disco | Aug. 9, 1949 |
| 2,583,075 | Anderson et al. | Jan. 22, 1952 |
| 2,669,013 | Wilson | Feb. 16, 1954 |
| 2,693,288 | Black | Nov. 2, 1954 |
| 2,798,625 | Mamo | July 9, 1957 |